United States Patent
Gilles et al.

(10) Patent No.: US 7,370,735 B2
(45) Date of Patent: May 13, 2008

(54) HYDRAULICALLY ACTUABLE VEHICLE BRAKE

(75) Inventors: Leo Gilles, Koblenz (DE); Marcus Janson, Koblenz (DE); Ralf Leiter, Vallendar (DE); Gregor Poertzgen, Koblenz (DE); Ralf Erben, Kemmenau (DE); Karl-Heinz Schaust, Fachbach (DE); Manfred Meyer, Gillenfeld (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/268,353

(22) Filed: Nov. 7, 2005

(65) Prior Publication Data

US 2006/0054431 A1   Mar. 16, 2006

Related U.S. Application Data

(63) Continuation of application No. PCT/EP2004/004771, filed on May 5, 2004.

(30) Foreign Application Priority Data

May 9, 2003  (DE) .................... 103 20 906

(51) Int. Cl.
*F16D 55/08* (2006.01)

(52) U.S. Cl. ................ 188/72.7; 188/72.9; 188/162

(58) Field of Classification Search .......... 188/72.7, 188/72.9, 2 D, 162, 72.6
See application file for complete search history.

(56) References Cited

U.S. PATENT DOCUMENTS

| | | | |
|---|---|---|---|
| 4,116,307 A | 9/1978 | Reinecke | |
| 5,060,765 A | 10/1991 | Meyer | |
| 6,422,354 B1 * | 7/2002 | Shaw et al. ............... | 188/72.8 |
| 6,478,120 B2 | 11/2002 | Runkel et al. | |
| 6,505,714 B1 | 1/2003 | Ward | |
| 6,761,252 B1 * | 7/2004 | Weiler et al. .............. | 188/72.7 |
| 6,851,525 B2 | 2/2005 | Baier-Welt et al. | |
| 2002/0079172 A1 | 6/2002 | Shaw et al. | |

FOREIGN PATENT DOCUMENTS

| | | |
|---|---|---|
| AT | 371 576 | 7/1983 |
| DE | 196 20 344 | 8/1997 |
| DE | 198 58 651 | 8/2000 |

(Continued)

*Primary Examiner*—Bradley King
(74) *Attorney, Agent, or Firm*—MacMillan, Sobanski & Todd, LLC

(57) ABSTRACT

In a vehicle brake having a brake piston accommodated in a housing, a blocking device for securing the brake piston inside the housing and an actuating device for controlling the blocking device, it is provided that the brake piston together with the housing delimits a fluid chamber, which is chargeable with hydraulic fluid, so that the brake piston for actuating the vehicle brake is displaceable hydraulically inside the housing along a piston longitudinal axis, that moreover the blocking device comprises a ramp arrangement and a blocking element that is displaceable relative to the housing, and that by means of the actuating device the blocking element in interaction with the ramp arrangement for securing the brake piston inside the housing is displaceable and connectable to the brake piston. In this vehicle brake, it is further provided that the actuating device comprises a motor drive, which is drive-connected to the ramp arrangement, wherein the blocking element upon activation of the motor drive is displaced to secure and release the brake piston inside the housing.

13 Claims, 8 Drawing Sheets

FOREIGN PATENT DOCUMENTS

| | | |
|---|---|---|
| DE | 101 04 158 | 8/2002 |
| DE | 101 03 295 | 9/2002 |
| EP | 0 403 635 | 8/1992 |
| EP | 0 551 397 | 9/1994 |
| EP | 1 054 180 | 11/2000 |
| EP | 1 096 166 | 5/2001 |

* cited by examiner

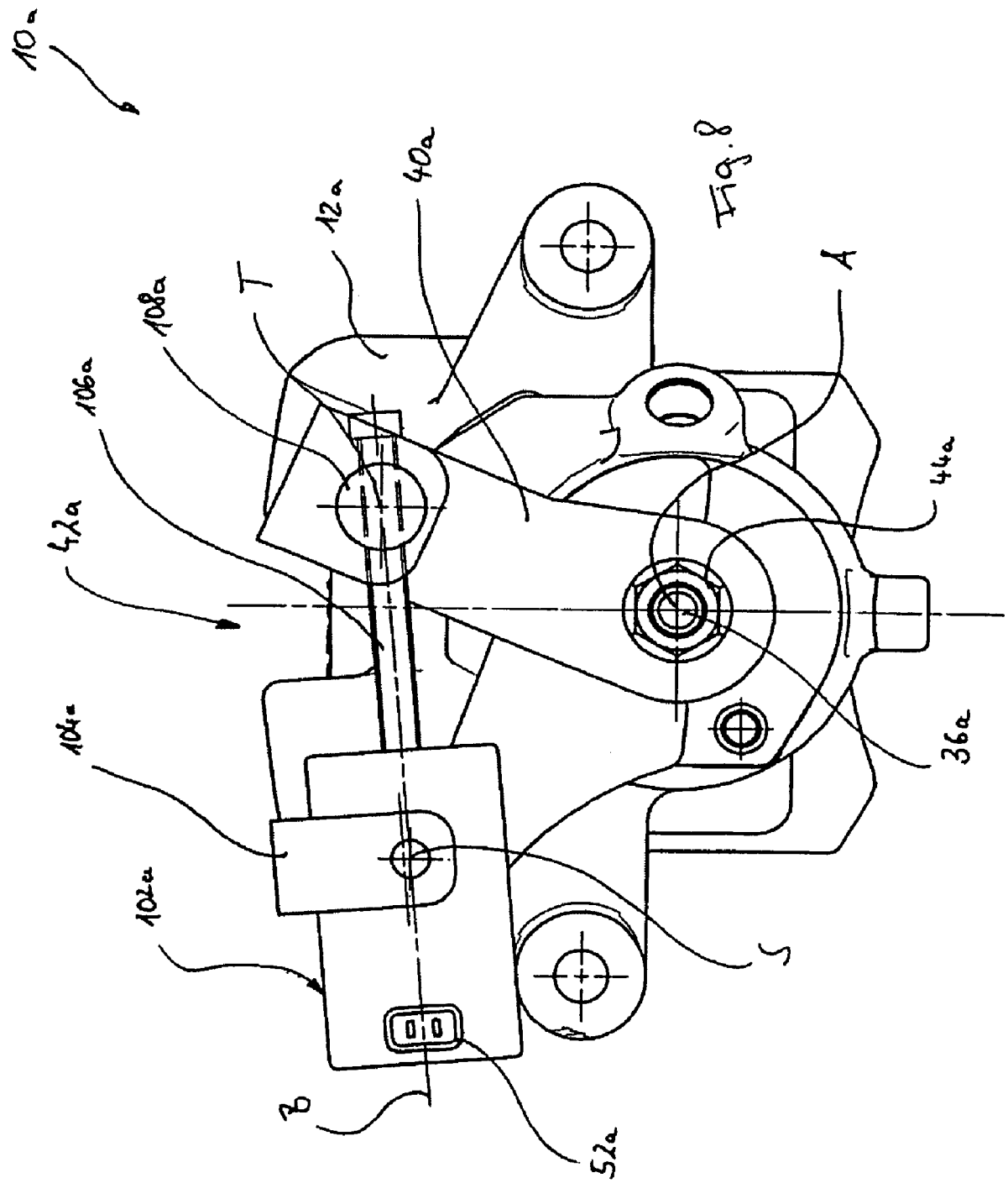

HYDRAULICALLY ACTUABLE VEHICLE BRAKE

CROSS-REFERENCE TO RELATED APPLICATIONS

This application is a continuation of International Application No. PCT/EP2004/004771 filed May 5, 2004, the disclosures of which are incorporated herein by reference in entirety, and which claimed priority to German Patent Application No. 103 20 906.9 filed May 9, 2003, the disclosures of which are incorporated herein by reference in entirety.

BACKGROUND OF THE INVENTION

The present invention relates to a hydraulically actuable vehicle brake having a housing, a brake piston accommodated in the housing and having a brake lining fitted thereon, a blocking device for securing the brake piston inside the housing and an actuating device for controlling the blocking device, wherein the brake piston together with the housing delimits a fluid chamber, which is chargeable with hydraulic fluid, so that the brake piston for actuating the vehicle brake is displaceable hydraulically inside the housing along a piston longitudinal axis, wherein the blocking device comprises at least one ramp arrangement and a blocking element displaceable relative to the housing and wherein by means of the actuating device the blocking element in interaction with the ramp arrangement for securing the brake piston inside the housing is displaceable and connectable to the brake piston.

Such a vehicle brake is already known. Thus, for example, the generic European patent EP 0 403 635 B1, and corresponding U.S. Pat. No. 5,060,765, both of which are incorporated by reference herein in entirety, discloses a vehicle brake of this type. In this vehicle brake, in a service braking situation the brake piston is displaced inside the housing by charging the fluid chamber with hydraulic fluid and the brake lining is consequently pressed onto a rotating brake disc in order to brake this brake disc. To terminate the braking operation, hydraulic fluid is discharged from the fluid chamber, so that the brake piston with the brake lining fitted thereon may move back into its initial position. In a parking braking situation, in which for example a vehicle equipped with such a vehicle brake parks and is to be secured against unintentional rolling away, a lever provided on the blocking device is swivelled by means of a Bowden cable, which is displaceable by means of a hand lever or pedal. Swivelling of the lever has the effect that the ramp arrangement expands inside the housing and hence executes a stroke in the direction of the piston longitudinal axis. This stroke is transmitted to the blocking element, which then presses counter to the action of a restoring spring upon the brake piston and axially displaces the brake piston. To cancel the parking braking situation, the lever of the blocking device is returned to its initial position, whereupon the ramp arrangement moves from its expanded position back into its initial position. Under the action of the restoring spring, the blocking element together with the brake piston is also moved into its initial position, with the result that the brake lining releases the brake disc.

In the case of this background art, it has emerged that the action of the vehicle brake in a parking braking situation is dependent upon the elastic properties and the thermal properties of the individual components involved in the force transfer path from the hand lever or pedal to the brake lining. If, for example, the parking braking function is activated after an extended period of vehicle operation, during which the individual components involved in the force transfer path have heated up, and these components cool down after parking of the vehicle, during cooling they then contract to a certain extent, thereby leading to dimensional changes. Because of these thermally induced dimensional changes, the clamping force exerted on the brake lining is reduced. This means that in this hydraulically actuable vehicle brake the actuating forces needed to activate the parking braking effect and summoned up at the hand lever or pedal have to be relatively high if a reliable parking braking effect is to be guaranteed. What is more, from a modern viewpoint it is uncomfortable for the driver to have to summon up the forces needed to activate the parking braking effect purely mechanically by means of a hand lever or pedal.

In contrast, EP 0 551 397 B1 discloses a hydraulically actuable vehicle brake, in which to activate the parking braking function first the brake piston is hydraulically displaced and then a blocking rod is electromotively driven until it contacts the brake piston. The blocking rod is provided with an external thread, which is in engagement with an internal thread provided in the housing. The mutually engaged threads are of a self-locking design, thereby preventing a mutual rotation between the blocking rod and the housing when an axial force acts upon the blocking rod. As soon as the blocking rod contacts the brake piston, the hydraulic fluid is discharged from the chamber. In said case, the brake piston attempts to move back into its initial position but is prevented from doing so by the blocking rod resting against it. The brake is therefore situated in its parking braking position. To cancel the parking braking effect, the fluid chamber is once more charged with hydraulic fluid so that the blocking rod is released by the brake piston. The blocking rod may then be moved back into its initial position by the electric motor. The hydraulic fluid may then be discharged from the fluid chamber, so that the brake piston may move back into its braking-effect-free initial position.

From U.S. Pat. No. 6,505,714 B1 moreover a vehicle brake is known, in which the parking braking function may be activated by a motor, wherein there is introduced into the clamping force path a spring element, which may compensate changes in the clamping path.

A similar solution is known from the Austrian patent specification AT 371 576, and corresponding U.S. Pat. No. 4,116,307, both of which are incorporated by reference herein in entirety, which describes a pneumatically actuated service- and parking brake. In this brake, a parking braking effect is activated by means of a spring in that two mutually corresponding tapered rings are brought into positive engagement with one another.

BACKGROUND OF THE INVENTION

A feature of the present invention is to provide a vehicle brake of the initially described type, which is comfortably actuable to activate the parking braking function and with which higher clamping forces may be summoned up to guarantee a reliable parking braking function.

This feature is achieved by a vehicle brake of the initially described type, in which the actuating device comprises a motor drive, which is drive-connected to the ramp arrangement in such a way that the blocking element upon activation of the motor drive is displaced to secure and release the brake piston inside the housing.

According to the invention, the vehicle brake is accordingly equipped with a motor-driven actuating device, which makes it superfluous for the driver to summon up in an uncomfortable and purely mechanical manner the clamping force needed to activate the parking braking function. Rather, an activation of the parking braking function may be effected electronically, i.e. by pressing a button or through automatic recognition of an operating situation. The vehicle brake according to the invention moreover allows the actual displacement of the brake piston plus its brake lining to be effected hydraulically also upon activation of the parking braking function and—where necessary—allows the actuating device to cause merely a clamping force increase in addition to the hydraulically generated clamping force. The blocking device additionally has the function of securing the brake piston in its axial position achieved as a result of the hydraulic displacement, thereby making it possible to maintain a sufficiently high clamping force, which, even in the event of elasticity-induced and thermally induced dimensional changes of the components involved in the clamping path, guarantees a reliable parking braking function.

With regard to the motor drive, it may be provided that it takes the form of a rotary drive, for example a conventional rotary electric motor may be used. Proceeding from this development of the invention, it may be provided that the actuating device comprises an eccentric arrangement, by means of which the motor drive is connected to the ramp arrangement. In said case, the eccentric arrangement may comprise an eccentric disc connected to the motor drive as well as a swivelling lever connected to the ramp arrangement, wherein the swivelling lever upon activation of the motor drive slides on the eccentric disc and in so doing swivels. By suitably selecting the shape of the eccentric disc and of the external contour of the swivelling lever, a desired clamping force characteristic may be achieved. In a development of the invention, it is possible for the external contour of the eccentric disc and of the swivelling lever to have contour portions, which in a state of mutual abutment lock eccentric disc and swivelling lever relative to one another, thereby preventing unintentional cancellation of the parking braking function.

Instead of a rotary drive, the motor drive may take the form of a linear drive. This may be achieved for example by connecting a rotary drive to a threaded mechanism that converts the rotational movement to a linear movement. Given the use of a linear drive, a development of the invention provides that the actuating device comprises a lever arrangement, by means of which the motor drive is connected to the ramp arrangement.

The motor drive may comprise an electric motor. It is equally possible for the motor drive—when in the form of a linear drive—to comprise a solenoid. The construction of the motor drive in the form of a hydraulic motor, particularly in the form of a hydraulically controllable piston/cylinder arrangement, is also possible within the framework of the invention.

With regard to the ramp arrangement, it may be provided that it comprises at least one first ramp surface, which is provided on the housing or connected thereto in a rotationally fixed manner, and at least one second ramp surface formed on a ramp component, which is displaceable relative to the housing and connected to the blocking element, wherein upon activation of the motor drive the two ramp surfaces slide on one another to displace the blocking element. In a development of this idea, the invention provides that between the at least one first ramp surface and the at least one second ramp surface rolling bodies are provided, via which the at least one first ramp surface is in contact with the at least one second ramp surface. Upon activation of the motor drive, such a ramp arrangement behaves in such a way that the second ramp surface, which is displaceable relative to the housing, executes an axial movement relative to the housing. This axial movement may be used to displace the brake piston in the direction of its piston longitudinal axis and hence load it towards a brake disc. Preferably, a plurality of complementary ramp surfaces interact, which are formed in a complementary manner on the housing and on the ramp component respectively. Suitable rolling bodies are, for example, balls or rollers.

With regard to operation of the vehicle brake according to the invention, it is provided that in a service braking situation the brake piston is displaceable inside the housing by charging the fluid chamber with hydraulic fluid and discharging hydraulic fluid from the fluid chamber and that in a parking braking situation first the brake piston is displaced inside the housing by charging the fluid chamber with hydraulic fluid, then the actuating device is actuated to secure the brake piston, wherein the blocking element is fed towards the brake piston, and finally for a pressure reduction in the fluid chamber hydraulic fluid is discharged from the fluid chamber. It may further be provided that to cancel the parking braking situation the fluid chamber is charged with hydraulic fluid until the blocking element is released by the brake piston, then the blocking element is removed from the brake piston by means of the blocking device and finally for a pressure reduction in the fluid chamber hydraulic fluid is discharged from the fluid chamber. Thus, to activate the parking braking function it is possible to use the clamping force summoned up by a hydraulic actuation and displacement of the brake piston for placing and clamping the brake lining onto the brake disc. In addition, the clamping force summoned up by the actuating device may be additively superimposed on the hydraulically summoned-up clamping force. In this way, progressively and without a significant expenditure of force having to be summoned up mechanically by the driver, a higher clamping force is achieved for the parking braking situation than was described previously with regard to the background art according to EP 0 403 635 B1. The hydraulic pressure in the fluid chamber is then reduced to zero. In said case, the brake piston moves back slightly in the direction of its initial position.

With regard to the arising axial forces, in a development of the invention it is provided that in terms of magnitude the axial force component, which is mechanically exerted on the brake piston in addition to the hydraulically generated axial force component upon actuation of the actuating device, is greater than or equal to a minimum axial force, by which the axial force exerted by the brake piston on a component to be braked is reduced after the brake piston has been secured and the hydraulic fluid discharged from the fluid chamber. The clamping force is therefore, after the discharge of hydraulic fluid from the fluid chamber, still high enough to be able to guarantee a reliable parking braking effect. Even in the event of thermally induced dimensional changes, such as may occur for example when the individual vehicle brake components involved in the clamping path cool down at the end of an extended period of travel, or in the event of elastic deformations under load and subsequent relaxation, the clamping force summoned up according to the invention is still high enough to be able to guarantee a reliable parking braking effect.

To cancel the parking braking situation, in the previously described variant of the invention it is necessary to charge the fluid chamber anew with hydraulic fluid and hence cancel a mechanical connection between brake piston and blocking device. The actuating device may then be correspondingly controlled and the blocking element may move back into its initial position, in which it releases the brake piston. Hydraulic fluid may then be discharged from the fluid chamber, so that the brake piston may move back into a braking-effect-free initial position. As an alternative to such a procedure, with a motor drive of a sufficiently powerful design it is also possible, without a renewed feed of hydraulic fluid, to move the blocking element back into its initial position and accordingly release the brake piston, so that the brake piston may adopt its braking-effect-free position.

The invention further relates to a method of actuating a vehicle brake of the previously described type, wherein in a service braking situation the brake piston is displaced inside the housing by feeding hydraulic fluid to the fluid chamber or discharging hydraulic fluid from the fluid chamber, and that in a parking braking situation first the brake piston is displaced inside the housing by charging the fluid chamber with hydraulic fluid, then the actuating device is actuated to secure the brake piston, wherein the blocking element is fed towards the brake piston and presses thereon, and finally for a pressure reduction in the fluid chamber hydraulic fluid is discharged from the fluid chamber. In said case, it may be provided that the axial force component, which is mechanically exerted on the brake piston in addition to the hydraulically generated axial force component upon actuation of the actuating device, is selected in such a way that in terms of magnitude it is greater than or equal to a minimum axial force, by which the axial force exerted by the brake piston on a component to be braked is reduced after the brake piston has been secured and the hydraulic fluid discharged from the fluid chamber. The minimum axial force may be determined, for example, from the difference of the moduli of elasticity of the components involved in the hydraulic displacement of the brake piston and the components involved in the mechanical actuation of the actuating device.

To cancel the parking braking situation, the fluid chamber is charged with hydraulic fluid until the blocking element is at least partially relieved or released by the brake piston, then the blocking element is removed from the brake piston by means of the blocking device and finally for a pressure reduction in the fluid chamber hydraulic fluid is discharged from the fluid chamber.

Other advantages of this invention will become apparent to those skilled in the art from the following detailed description of the invention, when read in light of the accompanying drawings.

BRIEF DESCRIPTION OF THE DRAWINGS

FIG. 8 a front view of the embodiment of FIG. 6.

DETAILED DESCRIPTION OF THE INVENTION

The first embodiment is first described below with reference to FIGS. 1 to 3.

Figure 1:
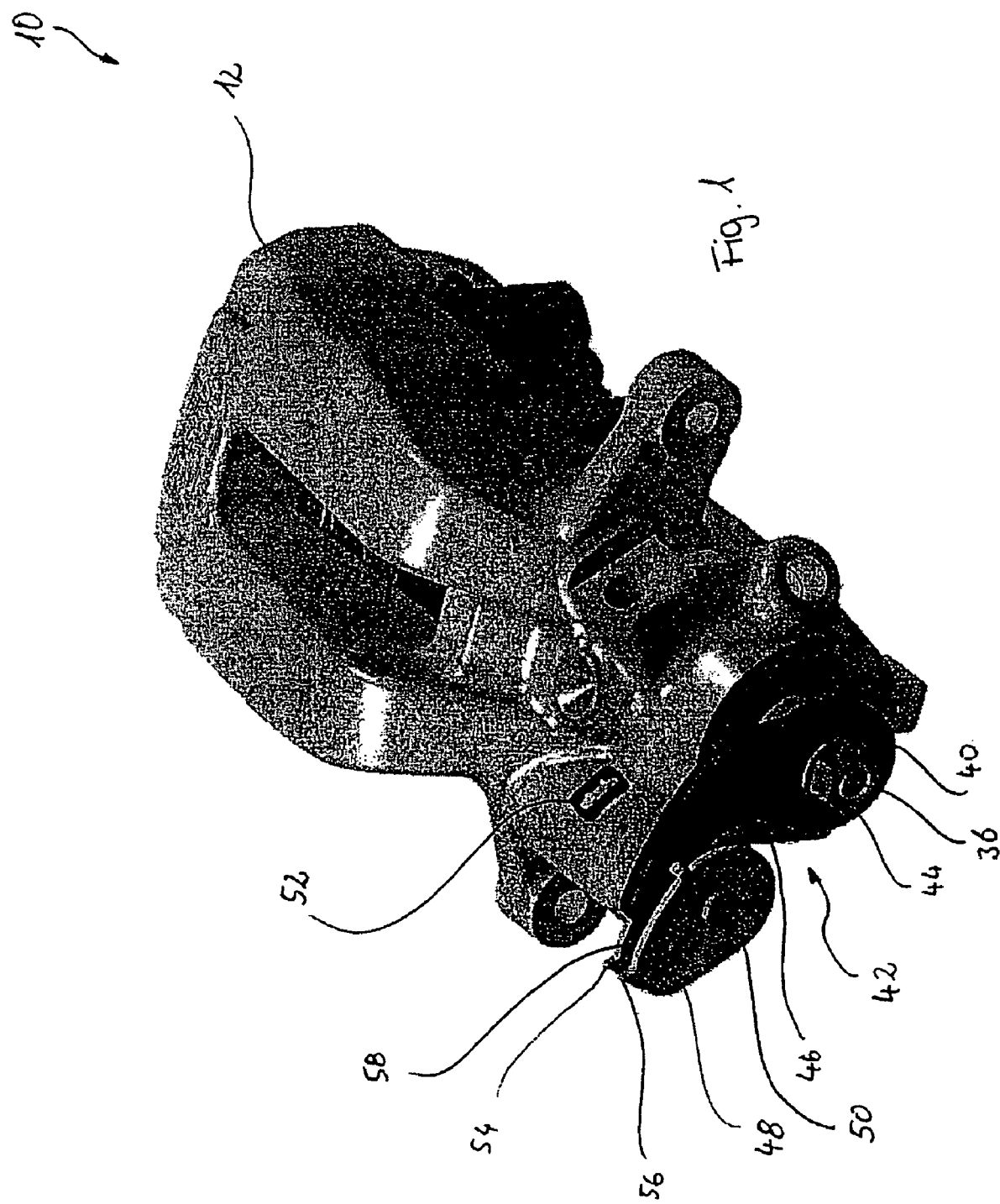
FIG. 1 a three-dimensional view of a first embodiment of a vehicle brake according to the invention.
Figure 2:
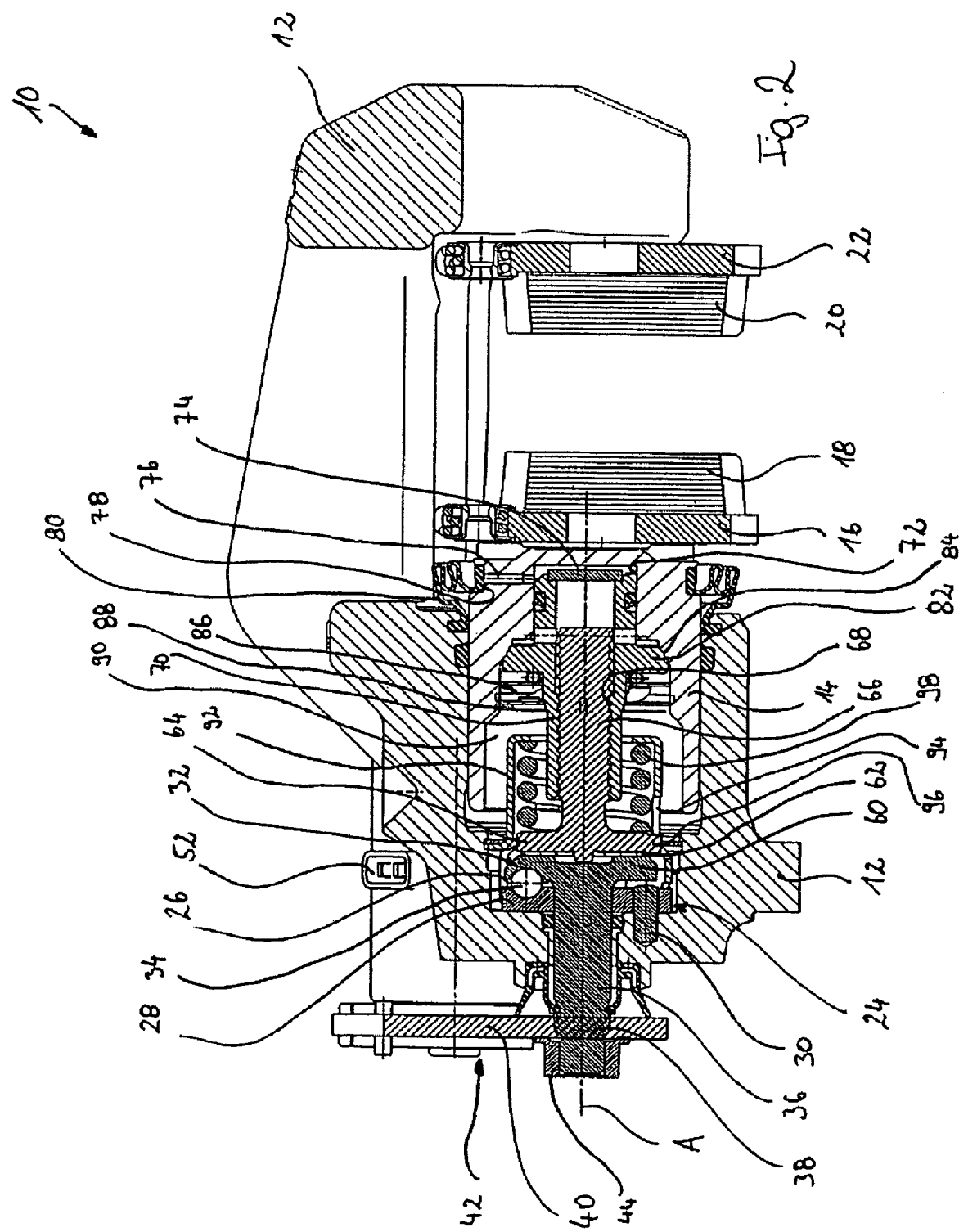
FIG. 2 a longitudinal section through the vehicle brake according to FIG. 1.
Figure 3:
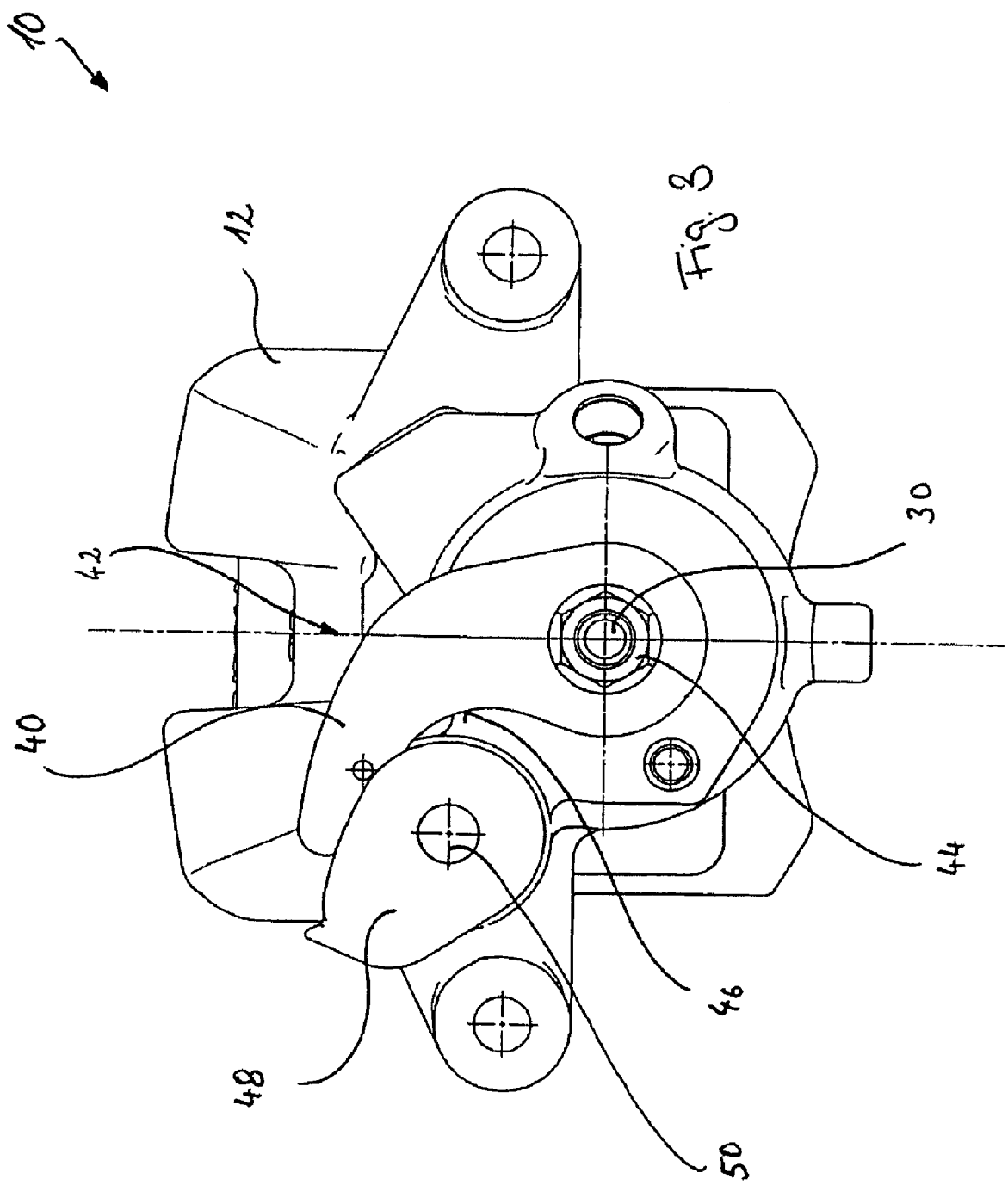
FIG. 3 a front view of the vehicle brake according to FIG. 1.

In FIGS. 1 to 3 a vehicle brake according to the invention is generally denoted by 10. The vehicle brake is designed with a housing 12, in which a brake piston 14 is accommodated. The brake piston 14 at its, in FIG. 2, right end is connected mechanically to a brake lining carrier 16, to which a brake lining 18 is fastened. Lying opposite the brake lining 18 is a further brake lining 20, which is fastened to a corresponding brake lining carrier 22. The brake lining carriers 16 and 22 are accommodated in the housing 12 in a conventional manner based on the floating caliper principle. This means that, when the brake lining carrier 16 is displaced along the piston longitudinal axis A in FIG. 2 to the right, there is a complementary displacement of the brake lining carrier 22 along the piston longitudinal axis A in FIG. 2 to the left, so that a clamping force may be exerted via the brake linings 18 and 20 from both sides on a brake disc, which is situated between the brake linings 18 and 20 and is not shown in the drawings.

The vehicle brake 10 further comprises a blocking device 24, by means of which the brake piston 14 may be secured in various axial positions along the piston longitudinal axis A. The blocking device 24 comprises a ramp arrangement 26 having a ramp disc 28, which is fastened by means of a bolt 30 to the housing 12. Formed on the housing-fixed ramp disc 28 are three trough-like ramps extending in peripheral direction, which each receive a spherical expansion body 34. The expansion bodies 34 each interact with a corresponding ramp of a ramp component 32. This ramp component 32 has a shaft portion 36, on the end of which a polygonal or multiple-spline profile 38 is formed. A swivelling lever 40 of an actuating device 42 is mounted positively onto this polygonal or multiple-spline profile 38 and secured mechanically by a lock nut 44. The swivelling lever 40—as FIGS. 1 and 3 reveal—is of a curved design and has a rolling curve 46. Via the rolling curve the swivelling lever 40 comes into contact with an eccentric disc 48, which is provided in a rotationally fixed manner on a motor shaft 50 of an electric motor, which is constructed with the housing 12 and controllable via the electrical connections 52. The eccentric disc arrangement 48, more precisely, comprises two plates 54 and 56, extending between which is an end face 58 that relative to the motor shaft 50 defines the eccentric path, along which the rolling curve 46 of the swivelling lever 40 rolls.

At its end remote from the swivelling lever 40, the ramp component 32 has a head 60 that contacts a thrust bearing 62. The thrust bearing 62 takes the form of a plain bearing but may equally take the form of a rolling-contact bearing, e.g. a thrust needle bearing. Against the pressure developed by the expansion bodies 26, the ramp component 32 is supported in axial direction via the thrust bearing 62 against an abutment 64, which is formed like a head on one end of a threaded bolt 66.

The threaded bolt 66 is screw-connected by means of a coarse-pitch thread pairing 68, which is self-locking and has a precisely defined backlash of threads, to a threaded bush 70 and together with it forms a strut, which is disposed coaxially with the piston 14 and the bolt 30 and the effective length of which may be increased in accordance with the gradually progressing wear of the brake linings 18 and 20.

The threaded bush 70 is designed as an auxiliary piston and guided displaceably in a corresponding auxiliary cylinder bore 72 in the piston 14.

The end of the threaded bush 70 facing a face of the piston 14 is hermetically sealed by a base plate 74. The part of the auxiliary cylinder bore 72 delimited by this base plate 74 and the face of the piston 14 is connected by a radial relief channel 76 to an outer groove 78 of the piston 14 to keep this part permanently unpressurized. Accommodated in the groove 78 is one end of bellows 80, which connect the end of the piston 14 projecting from the housing 12 to the housing 12 and hence protect the interior of the housing 12 from fouling.

Formed on the threaded bush 70 is a tapering flange 82, with which an internal taper 84 in the piston 14 is associated. Inside the piston 14, a spring washer arrangement 86 is disposed with axial bias between the flange 82 and a locking ring 88, which is latched in the piston 14. The spring washer arrangement 86 normally holds the flange 82 in abutment with the internal taper 84 and therefore prevents a rotation of the threaded bush 70 relative to the piston 14. The piston 14 in turn is normally prevented from rotating by conventional means, for example by its interaction with the brake lining carrier 16.

Disposed inside the housing 12 in a fluid chamber 90 enclosed by housing 12 and piston 14 is a sleeve- or cage-like insert 92, which is fastened to the housing 12 so as to be locked against axial displacement and rotation. The insert 92 is fashioned, for example as a deep-drawn part made of sheet metal, in such a way that the threaded bolt 66 is locked against rotation by the insert 92 without being prevented from axial displacements. The insert 92 has a plurality of longitudinal grooves 94, into each of which a radial projection 96 of the abutment 64 engages.

Against the side of the abutment 64 remote from the thrust bearing 62 a restoring spring 98, in the illustrated example a helical wire spring, is supported by one end; its other end is supported in a housing-fixed manner against the inside of the insert 92. The restoring spring 98 is biased with a specific force of e.g. 50 kp, so that it attempts to hold the ramp component 32 in its position most closely adjacent to the housing-fixed ramp disc 28, namely in the inoperative position.

The vehicle brake 10 according to FIGS. 1 to 3 operates as follows:

In a service braking situation, in which a rotating brake disc disposed between the brake linings 18 and 20 but not shown in the drawings is to be braked, the fluid chamber 90 is charged with hydraulic fluid and the brake piston 14 is therefore displaced inside the housing 12. So long as this displacement is not greater than the backlash of threads, which exists in the coarse-pitch thread pairing 68 between the threaded bolt 66 and the threaded bush 70 and corresponds to the provided brake clearance, the threaded bush 70 simultaneously executes the displacement of the brake piston 14 in full; the spring washer arrangement 86 therefore still does not yield.

If, however, because of wear of the brake linings the brake piston 14 has to travel further than the provided brake clearance in order to lay the brake linings 18 and 20 against the non-illustrated brake disc, then the threaded bolt 66 held back by the restoring spring 98 prevents the threaded bush 70, upon hydraulic actuation, from simultaneously executing the entire displacement of the brake piston 14 towards the brake disc. Consequently, the tapering flange 82 of the threaded bolt 66 is lifted slightly off the internal taper 84 counter to the resistance of the spring washer arrangement 86, which resistance is weaker than the bias of the restoring spring 98. The threaded bush 70 is therefore no longer prevented from rotating about its axis A.

The axial force, which is transmitted by the coarse-pitch thread pairing 68 and with which the threaded bolt 66 attempts to hold back the threaded bush 70, has a peripheral component. This results in a torque, by means of which the threaded bush 70 is then rotated in such a way that it screws off the threaded bolt 66. Consequently, the tapering flange 82 comes to lie once more against the internal taper 84 of the brake piston 14. As the effective length of the strut formed by the threaded bolt 66 and the threaded bush 70 has now been increased, the brake piston 14 after the brake actuation is prevented from returning fully into its original initial position. The brake clearance has therefore been reduced to its setpoint value once more.

If in the event of a powerful hydraulic brake actuation a pressure of e.g. 20 bar or more arises inside the fluid chamber 90, this inevitably entails elastic deformations particularly in the region of the brake linings 18 and 20, the brake lining carriers 16 and 22 and the housing 12. A readjustment, which would compensate such temporary deformations, is unwanted and therefore prevented in the following manner:

The pressure in the fluid chamber 90 acts also upon the threaded bush 70 designed as an auxiliary piston. In the event of powerful hydraulic actuation, the axial forces exerted by the spring washer arrangement 86 and by the hydraulic pressure on the threaded bush 70 are altogether greater than the force exerted by the restoring spring 98 on the abutment 64 formed on the threaded bolt 66. The restoring spring 98 is therefore no longer able to hold the threaded bush 70 fast. The flange 82 is therefore unable to lift off the internal taper 84. The threaded bush 70 is therefore still prevented from rotating and the brake actuation therefore occurs without readjustment. It is only when the hydraulic pressure has dropped below the said threshold value of e.g. 20 bar that a readjustment may be re-established, if this has become necessary as a result of progressive wear of the brake linings 18 and 20.

There now follows a detailed description of the activation of the parking braking function of the vehicle brake according to the invention, with which the brake disc provided between the brake linings 18 and 20 is to be locked against unintentional rotation. To explain the parking brake function, reference will be made additionally to the diagrammatic representation of the pressure characteristic and the clamping force characteristic according to FIG. 4.

To actuate the vehicle brake 10 in a parking braking situation, first the fluid chamber 90 is charged with hydraulic fluid and the hydraulic pressure prevailing therein is raised from the value $p_0$ (0 bar) to the value $p_1$, so that the brake linings 18 and 20 are pressed onto the non-illustrated brake disc. At time $t_1$ the pressure $p_1$ of 120 bar is reached in the fluid chamber 90. This leads to a clamping force $F_3$. While the brake piston 14, under the action of the hydraulic fluid at hydraulic pressure p1 in the fluid chamber 90, is being pressed towards the non-illustrated brake disc, starting from time $t_1$ the ramp arrangement 26 is activated by the actuating device 42, so that the ramp arrangement 26 expands. This means that the ramp component 32 by the agency of the expansion bodies 34 is displaced by the housing-fixed ramp disc 28 in FIG. 2 to the right in the direction of the longitudinal axis A. In said case, with simultaneous deformation of the restoring spring 98, the threaded bolt 66 is also displaced in FIG. 2 to the right. The force thus transmitted is transmitted via the coarse-pitch thread pairing 68 to the threaded bush 70. The threaded bush 70 presses with its flange 82 against the internal taper 84 and transmits the actuating force emanating from the actuating device 42 to the brake piston 14, which is therefore pressed more strongly in FIG. 2 to the right in the direction of the non-illustrated brake disc. The hydraulically generated force component $F_3$ and the force component generated by the ramp arrangement are additively superimposed, thereby resulting at time $t_2$ in a clamping force $F_1$.

At time $t_3$ the pressure is reduced from the value $p_1$ by discharging hydraulic fluid from the fluid chamber 90 until finally the hydraulic pressure in the fluid chamber 90 assumes the value $p_0$ once more. During the discharge of hydraulic fluid from the fluid chamber 90, the assembly group—formed by threaded bush 70, threaded bolt 66, ramp component 32 and expansion bodies 34—blocks a restoring movement of the piston 14 and therefore keeps this piston 14 substantially fixed in its axial position. The parking braking function is therefore activated. During the discharge of hydraulic fluid from the fluid chamber 90, the clamping force F drops from the value $F_1$ to the value $F_2$. In this state, the brake piston 14 presses with the clamping force $F_2$ upon the non-illustrated brake disc and keeps it locked against rotation. The drop in force from the force value $F_1$ to the force value $F_2$ may be explained by the fact that, after the reduction of the hydraulic pressure inside the fluid chamber 90, the system slightly relaxes elastically and the brake piston 14 therefore moves slightly back in the direction of its initial position. This restoring movement is however small enough and the clamping force $F_1$ is high enough to be able, even after a complete reduction of the hydraulic pressure in the fluid chamber 90 to the value $p_0$, still to maintain a clamping force $F_2$, which is sufficient to lock the brake disc against unintentional rotation.

Figure 4:
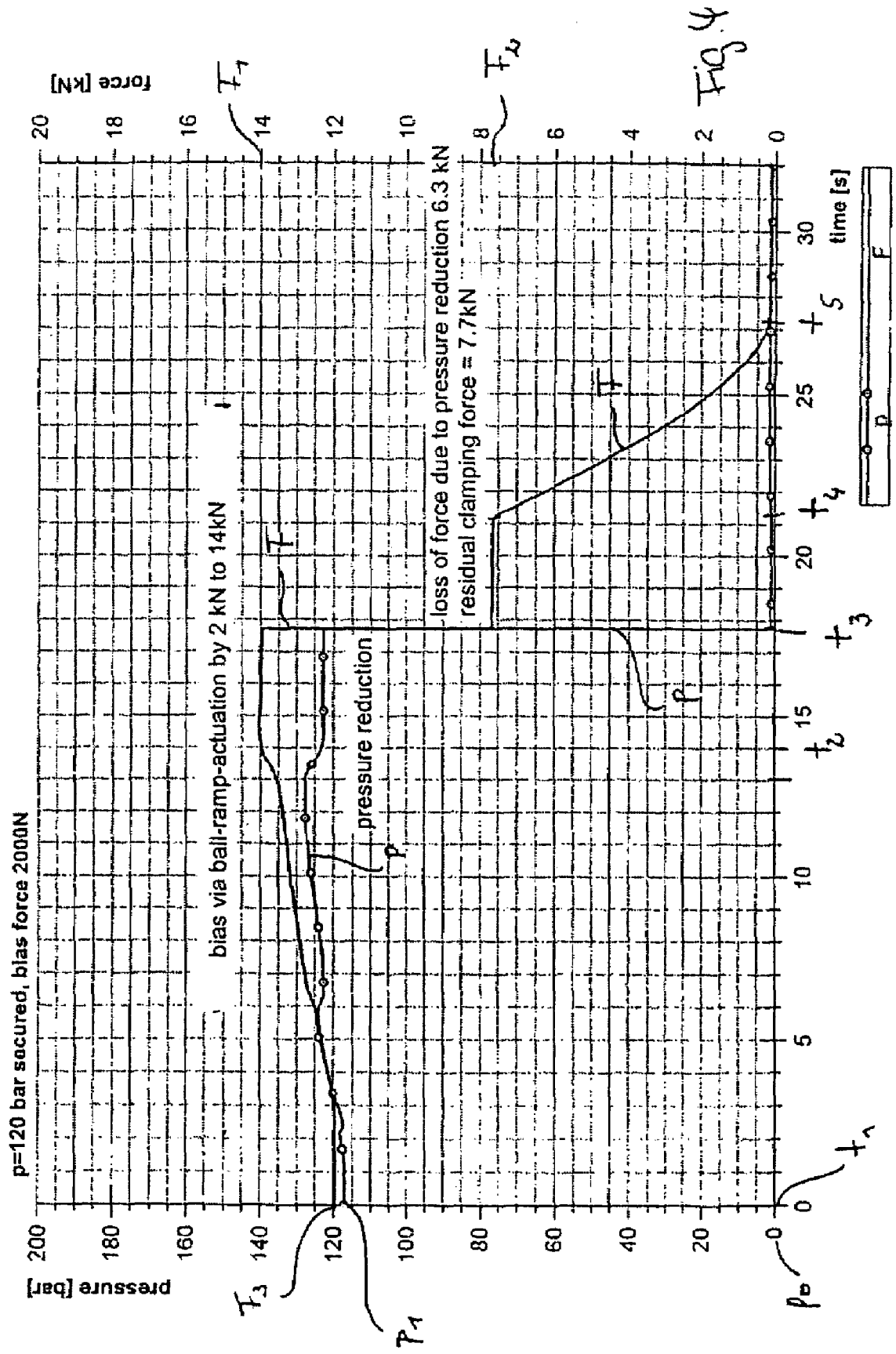
FIG. 4 a graph showing the characteristic of the hydraulic pressure in the fluid chamber and the clamping force characteristic for an exemplary activation of the parking braking function.

To cancel the parking braking function, according to FIG. 4 at time $t_4$ by means of an actuation of the actuating device 42 by a sufficiently powerful electric motor the expansion of the ramp arrangement 26 is cancelled, so that the threaded bolt 66 and the threaded bush 70 move back into their initial positions. The brake piston 14 may therefore move back into its initial position according to FIG. 2, finally reaching this position at time $t_5$. Between the times $t_4$ and $t_5$ the clamping force F continuously decreases.

By virtue of the actuation of the actuating device and the resulting expansion of the ramp arrangement 26, the clamping force F is therefore increased from the value $F_3$ of 12 kN, which is generated by the hydraulic pressure inside the fluid chamber 90 of approximately 120 bar, to a value $F_1$ of 14 kN. At time $t_3$ the pressure p is then reduced to 0 bar. In said case, the clamping force also drops to the value $F_2$ of 7.7 kN, i.e. the clamping force decreases by 6.3 kN.

Alternatively, at time $t_4$, to release the parking brake, the hydraulic pressure may be increased again until it reaches the value $p_1$. In said case, the clamping force also continues to increase from the clamping force $F_2$ until it finally reaches the clamping force value $F_3$, at which the flange 82 no longer presses so strongly upon the internal taper 84, thereby allowing the threaded bush 70 to rotate relative to the piston 14. The electric motor is then activated so that the actuating device 42 may rotate the bolt 30 back into its initial position according to FIG. 2. In said case, with simultaneous cancellation of the expanded state, the head 60 moves back towards the housing-fixed ramp disc 28 until the ramp component 32 readopts its position shown in FIG. 2. The threaded bolt 66 may therefore move back into its initial position shown in FIG. 2 and, with it, the threaded bush 70. Finally, the hydraulic pressure in the fluid chamber 90 is then reduced until it reaches the value $p_0$. In this state, the vehicle brake 10 has returned to its braking-effect-free position shown in FIG. 2.

Figure 5:
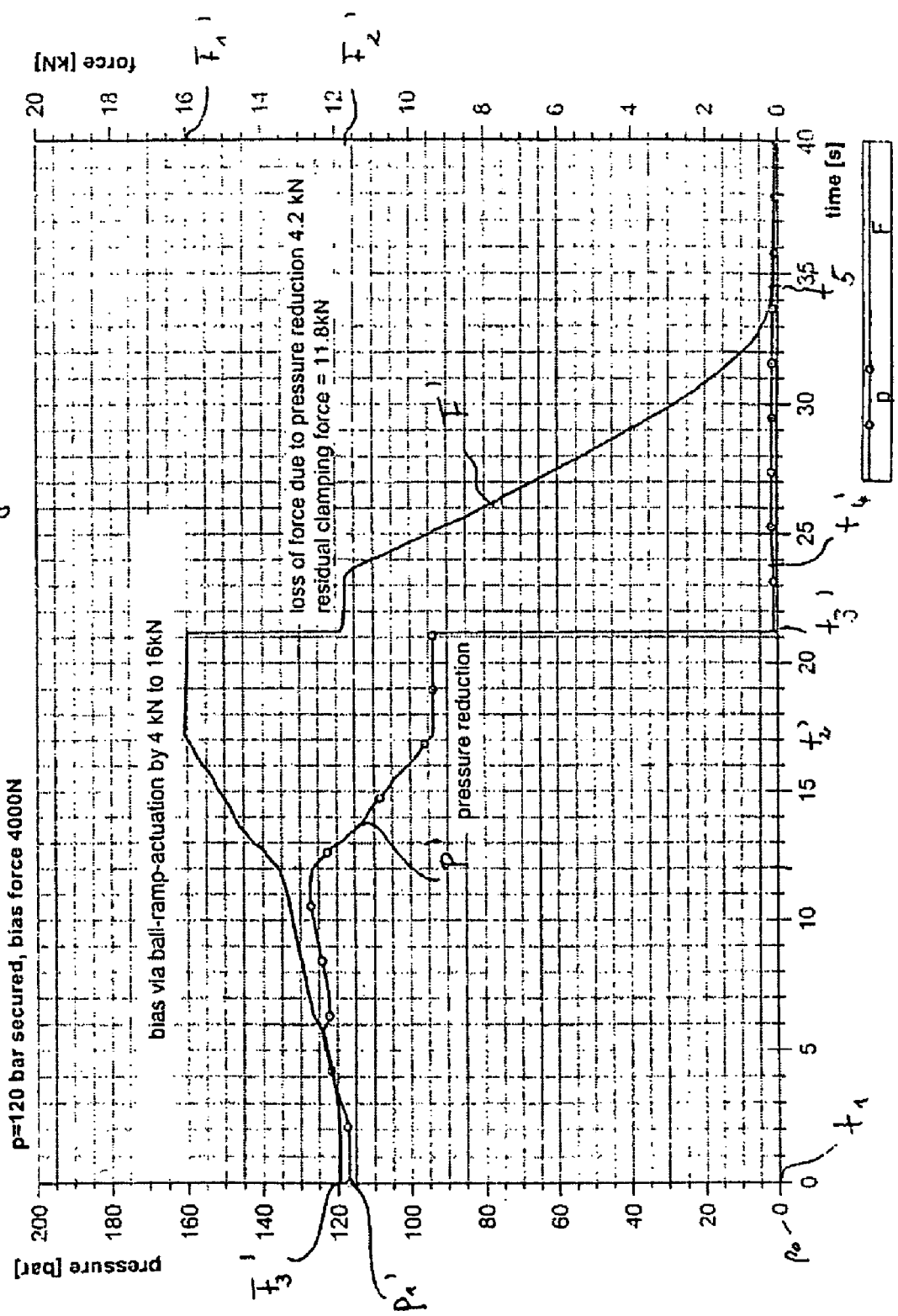
FIG. 5 a graph corresponding to FIG. 4 with an activation of the parking braking function that differs therefrom.

FIG. 5 shows a similar diagram, in which the force component summoned up additionally by the ramp arrangement 26 is twice as great as in the clamping operation according to FIG. 4. This means that the additional clamping force is 4 kN. The clamping force characteristic, however, despite the different amounts corresponds qualitatively to the clamping force characteristic described in FIG. 4 at the corresponding times and has accordingly been provided with the same reference characters, only with an added apostrophe. The clamping force is increased by the expansion of the ramp arrangement 26 from 12 kN to 16 kN and drops, after reduction of the hydraulic pressure p to the value of 0 bar, to the value 11.8 kN, with which the brake disc in the parking braking situation is then held against unintentional rotation.

Figure 6:
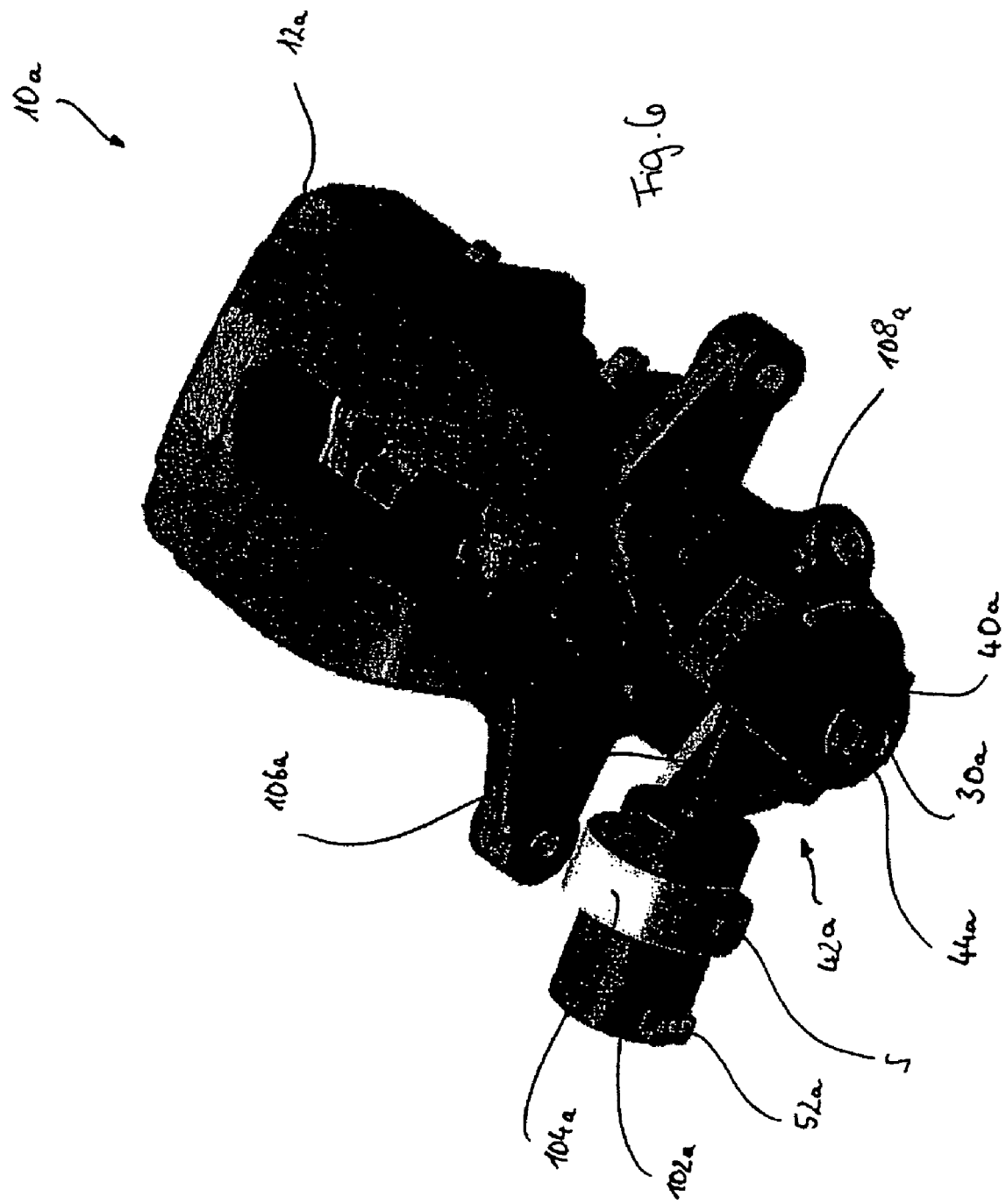
FIG. 6 a three-dimensional view of a second embodiment.
Figure 7:
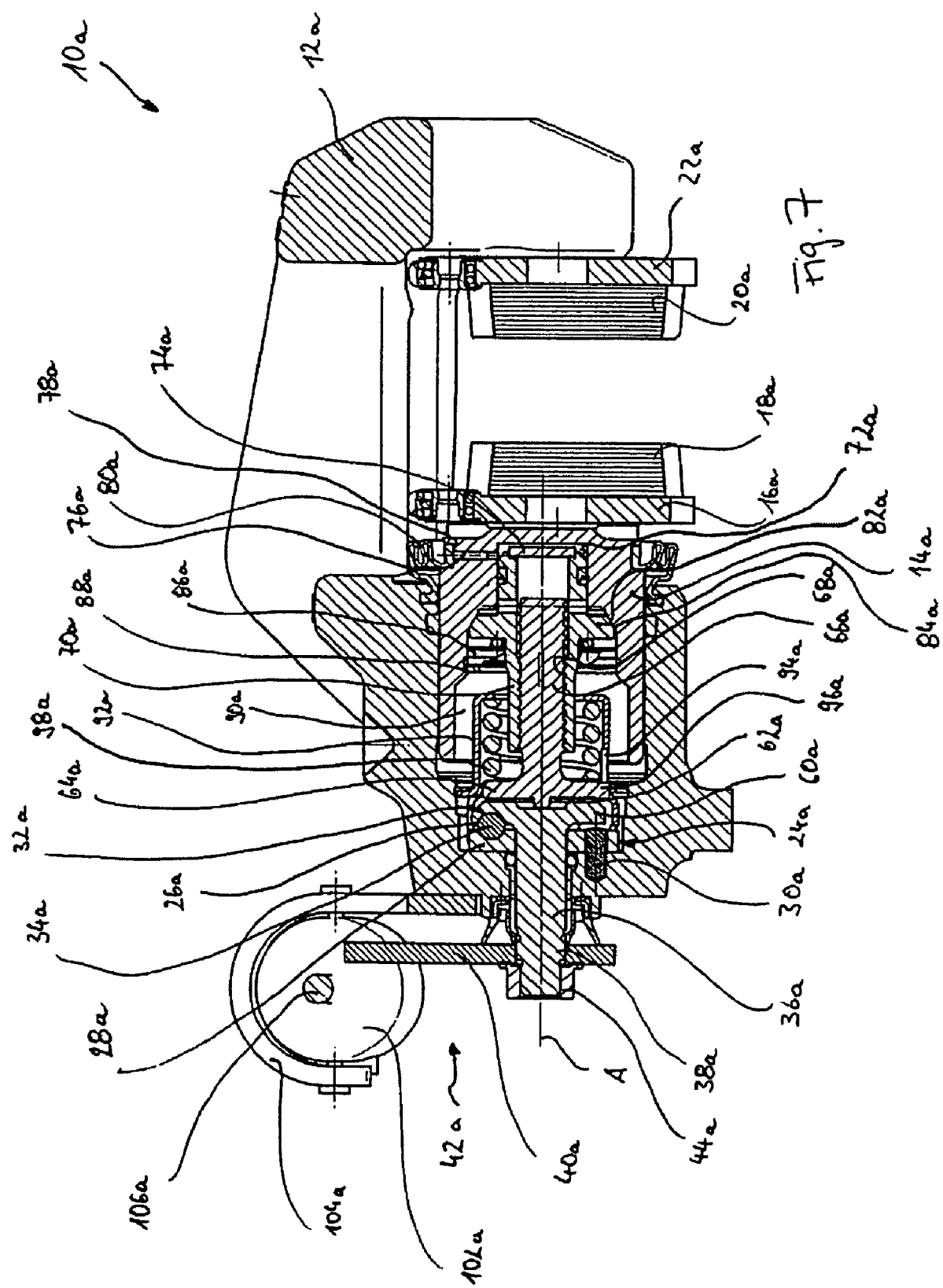
FIG. 7 a longitudinal section of the embodiment according to FIG. 6.

FIGS. 6 to 8 show a second embodiment of the vehicle brake according to the invention. To avoid repetition and simplify the description, for components of an identical type or an identical effect the same reference characters are used as in the description of the first embodiment according to FIGS. 1 to 3, only with the lower-case letter "a" attached. To avoid repetition, only the differences in the embodiments according to FIG. 1 are described.

The embodiment according to FIGS. 6 to 8 differs from the first embodiment according to FIGS. 1 to 3 merely in the design of the actuating device 42. Instead of an electric motor, which is integrated in the housing 12 and has a motor shaft 50, the longitudinal axis of which extends substantially parallel to the piston longitudinal axis A, the second embodiment according to FIGS. 6 to 8 has an electric motor 102*a*, which is fitted by means of a bracket 104*a* in such a way to the housing 12 that it may move about a swivelling axis S, which extends substantially parallel to the piston longitudinal axis A. Running orthogonally relative to the swivelling axis S and the piston longitudinal axis A is a motor longitudinal axis B, extending along which is a threaded spindle 106, which is rotatable by the electric motor 102*a* in both directions of rotation about the motor longitudinal axis B. Screwed on the threaded spindle 106 is a journal 108, which is supported pivotably about the swivelling axis T in the lever 40*a*. The lever 40*a* is attached to the bolt 36*a* in a similar manner to the first embodiment according to FIGS. 1 to 3.

The service braking function of the second embodiment according to FIGS. 6 to 8 is identical to the first embodiment according to FIGS. 1 to 3. To activate the parking braking function, the motor 102*a* is energized. In said case, the threaded spindle 106*a* rotates so that the journal 108*a* with an internally threaded bore is displaced along the motor longitudinal axis B on the threaded spindle 106*a*. Given such a displacement, the motor 102*a* swivels about the swivelling axis S. At the same time, the journal 108*a* swivels about the swivelling axis T. Because of the displacement of the journal 108*a*, the lever 40*a* swivels about the motor longitudinal axis A. Depending on the direction of rotation of the threaded spindle 106*a*, the lever 40*a* may be swivelled in FIG. 8 in clockwise direction or in anticlockwise direction. A swivelling of the lever 40*a* has the same result as the swivelling of the lever 40 in the first embodiment according to FIGS. 1 to 3, namely an actuation of the ramp arrangement 26a and hence an activation and/or deactivation of the parking braking function.

The embodiments described above with reference to FIGS. 1 to 8 show a vehicle brake, in which to activate the parking braking function the hydraulic actuation of the service braking function may be used in order to be able to achieve high parking clamping forces. The actuating device for activating the parking braking function is designed in such a way that it is possible to superimpose on the clamping force component caused by the hydraulic actuation a clamping force component generated in a motorized manner by the actuating device. Finally, for activating the parking braking function without entailing a mechanical expenditure by the driver, clamping forces may be achieved, which guarantee a reliable parking braking effect in any operating state.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Vehicle brake comprising:
   a housing,
   a brake piston, which is accommodated in the housing and on which a brake lining is fitted,
   a blocking device for securing the brake piston inside the housing and an actuating device for controlling the blocking device,
   wherein the brake piston together with the housing delimits a fluid chamber, which is chargeable with hydraulic fluid, so that the brake piston for actuating the vehicle brake is displaceable hydraulically inside the housing along a piston longitudinal axis,
   wherein moreover the blocking device comprises a ramp arrangement and a blocking element that is displaceable relative to the housing, wherein moreover by means of the actuating device the blocking element in interaction with the ramp arrangement for securing the brake piston inside the housing is displaceable and connectable to the brake piston,
   and wherein the actuating device comprises a motor drive, which is drive-connected to the ramp arrangement in such a way that the blocking element upon activation of the motor drive is displaced to secure and release the brake piston inside the housing,
   wherein the motor drive is integrated in the housing or provided on the housing, and wherein the actuating device comprises an eccentric arrangement, by means of which the motor drive is connected to the ramp arrangement.

2. Vehicle brake according to claim 1, wherein the motor drive takes the form of a rotary drive.

3. Vehicle brake according to claim 1, wherein the eccentric arrangement comprises an eccentric disc connected to the motor drive as well as a swivelling lever connected to the ramp arrangement, wherein the swivelling lever upon activation of the motor drive slides on the eccentric disc and in so doing swivels.

4. Vehicle brake according to claim 1, wherein the motor drive comprises an electric motor.

5. Vehicle brake according to claim 1, wherein the ramp arrangement comprises at least one first ramp surface, which is provided on the housing or connected thereto in a rotationally fixed manner, and at least one second ramp surface formed on a ramp component, which is axially displaceable relative to the housing and connected to the blocking element, wherein upon activation of the motor drive the two ramp surfaces slide on one another for displacement of the blocking element.

6. Vehicle brake according to claim 5, wherein provided between the at least one first ramp surface and the at least one second ramp surface are rolling bodies, via which the at least one first ramp surface is in contact with the at least one second ramp surface.

7. Vehicle brake according to claim 1, wherein in a service braking situation the brake piston is displaceable inside the housing by charging the fluid chamber with hydraulic fluid and discharging hydraulic fluid from the fluid chamber and that in a parking braking situation first the brake piston is displaced inside the housing by charging the fluid chamber with hydraulic fluid, then the actuating device is activated to secure the brake piston, wherein the blocking element is fed towards the brake piston and presses thereon, and finally for a pressure reduction in the fluid chamber hydraulic fluid is discharged from the fluid chamber.

8. Vehicle brake according to claim 7, wherein the axial force component, which is exerted mechanically on the brake piston in addition to the hydraulically generated axial force component upon actuation of the actuating device, is in terms of magnitude greater than or equal to a minimum axial force, by which the axial force exerted by the brake piston on a component to be braked is reduced after the brake piston has been secured and the hydraulic fluid discharged from the fluid chamber.

9. Vehicle brake according to claim 7, wherein for cancelling the parking braking situation the fluid chamber is charged with hydraulic fluid, wherein the blocking element is at least partially relieved by the brake piston, then the blocking element is removed from the brake piston by means of the blocking device and finally for a pressure reduction in the fluid chamber hydraulic fluid is discharged from the fluid chamber.

10. Vehicle brake according to claim 1, wherein in a service braking situation the brake piston is displaced inside the housing by feeding hydraulic fluid to the fluid chamber or discharging hydraulic fluid from the fluid chamber, and that in a parking braking situation first the brake piston is displaced inside the housing by charging the fluid chamber with hydraulic fluid, then the actuating device is actuated to secure the brake piston, wherein the blocking element is fed towards the brake piston and presses thereon, and finally for a pressure reduction in the fluid chamber hydraulic fluid is discharged from the fluid chamber.

11. Vehicle brake according to claim 10, wherein the axial force component, which is exerted mechanically on the brake piston in addition to the hydraulically generated axial force component upon actuation of the actuating device, is selected in such a way that in terms of magnitude it is greater than or equal to a minimum axial force, by which the axial force exerted by the brake piston on a component to be braked is reduced after the brake piston has been secured and the hydraulic fluid discharged from the fluid chamber.

12. Vehicle brake according to claim 11, wherein the minimum axial force is determined from the difference of the moduli of elasticity of the components involved in the hydraulic displacement of the brake piston and the components involved in the mechanical actuation of the actuating device.

13. Vehicle brake according to claim 10, wherein to cancel the parking braking situation the fluid chamber is charged with hydraulic fluid, wherein the blocking element is at least partially relieved by the brake piston then the blocking element is removed from the brake piston by means of the blocking device and finally for a pressure reduction in the fluid chamber hydraulic fluid is discharged from the fluid chamber.

* * * * *